(12) United States Patent
Nakovski et al.

(10) Patent No.: US 10,030,790 B2
(45) Date of Patent: Jul. 24, 2018

(54) SUSPENSION SYSTEM ESPECIALLY FOR UNDERWATER CABLE

(71) Applicant: PMI Industries, Inc., Cleveland, OH (US)

(72) Inventors: Konstantin Nakovski, Bedford, OH (US); Carl C. Petersen, Mentor, OH (US); Jay C. Marino, South Euclid, OH (US); Robert G. Gannon, North Olmsted, OH (US); Lawrence W. Taylor, Twinsburg, OH (US)

(73) Assignee: PMI INDUSTRIES, INC., Cleveland, OH (US)

( * ) Notice: Subject to any disclaimer, the term of this patent is extended or adjusted under 35 U.S.C. 154(b) by 197 days.

(21) Appl. No.: 14/652,413

(22) PCT Filed: Dec. 16, 2013

(86) PCT No.: PCT/US2013/075454
§ 371 (c)(1),
(2) Date: Jun. 15, 2015

(87) PCT Pub. No.: WO2014/093975
PCT Pub. Date: Jun. 19, 2014

(65) Prior Publication Data
US 2015/0330533 A1 Nov. 19, 2015

Related U.S. Application Data

(60) Provisional application No. 61/737,288, filed on Dec. 14, 2012.

(51) Int. Cl.
*E21F 17/02* (2006.01)
*F16L 3/12* (2006.01)
(Continued)

(52) U.S. Cl.
CPC ............ *F16L 3/12* (2013.01); *B63B 21/66* (2013.01); *F16L 3/08* (2013.01); *F16L 3/18* (2013.01);
(Continued)

(58) Field of Classification Search
CPC ....... F16L 3/12; F16L 3/08; F16L 3/18; F16L 3/20; B63B 21/66; G01V 1/202; G01V 1/3843; Y10T 29/49876; F16G 11/00
(Continued)

(56) References Cited

U.S. PATENT DOCUMENTS 1,779,564 A * 10/1930 Slagel ................ F25D 23/006
248/318
2,339,565 A * 1/1944 Goldberg ................ F16L 3/11
248/59
(Continued)

FOREIGN PATENT DOCUMENTS

GB 2 223 732 A 4/1990
GB 2537129 A * 10/2016 ............. E21B 19/12

OTHER PUBLICATIONS

PCT/US2013/075454, "International Search Report and Written Opinion", dated Jun. 16, 2014.

*Primary Examiner* — Gwendolyn W Baxter
(74) *Attorney, Agent, or Firm* — Fay Sharpe LLP

(57) ABSTRACT

A suspension system receives an associated cable. The suspension system includes first and second mount arms disposed in spaced relation that receive a collar assembly having first and second collar members dimensioned to circumferentially enclose around the associated cable in a first assembled position, and a second open position, where the first and second collar members do not circumferentially enclose the associated cable. Sheave mount assemblies are provided along the interconnecting posts and various degrees of freedom are incorporated into the modular assembly.

17 Claims, 21 Drawing Sheets

(51) Int. Cl.
*F16L 3/08* (2006.01)
*F16L 3/18* (2006.01)
*F16L 3/20* (2006.01)
*B63B 21/66* (2006.01)
*G01V 1/20* (2006.01)
*F16G 11/00* (2006.01)
*G01V 1/38* (2006.01)

(52) U.S. Cl.
CPC .............. *F16L 3/20* (2013.01); *G01V 1/202* (2013.01); *F16G 11/00* (2013.01); *G01V 1/3843* (2013.01); *Y10T 29/49876* (2015.01)

(58) Field of Classification Search
USPC .................. 248/61, 62, 63, 74.4, 77, 78
See application file for complete search history.

(56) References Cited

U.S. PATENT DOCUMENTS

| | | | | |
|---|---|---|---|---|
| 2,695,770 A | * | 11/1954 | Stone | E21B 19/02 15/220.4 |
| 3,944,175 A | * | 3/1976 | Kearney | F16L 3/227 248/201 |
| 4,146,203 A | * | 3/1979 | Williams | F16L 3/11 138/107 |
| 5,192,039 A | * | 3/1993 | Williams | F16L 59/135 138/107 |
| 5,197,716 A | | 3/1993 | Zibilich, Jr. et al. | |
| 5,979,838 A | * | 11/1999 | Romagnoli, Jr. | F16L 1/26 248/62 |
| 6,010,273 A | | 1/2000 | Metzler, Jr. | |
| 6,113,039 A | * | 9/2000 | Riffle | A62C 33/04 222/74 |
| 6,350,077 B1 | | 2/2002 | Palmquist | |
| 6,390,421 B1 | * | 5/2002 | Rudd | F16L 3/133 248/62 |
| 7,614,593 B2 | * | 11/2009 | McClure | E21B 17/1035 248/229.14 |
| 7,845,597 B2 | * | 12/2010 | Gatta | B60R 9/055 248/57 |
| 8,619,496 B2 | | 12/2013 | Hartland | |
| 8,985,533 B2 | * | 3/2015 | Edmond | F16L 3/227 248/68.1 |
| 9,000,299 B2 | * | 4/2015 | Ruth | H02G 3/32 174/40 CC |
| 2009/0188203 A1 | * | 7/2009 | Fox | H02G 3/32 52/741.3 |

* cited by examiner

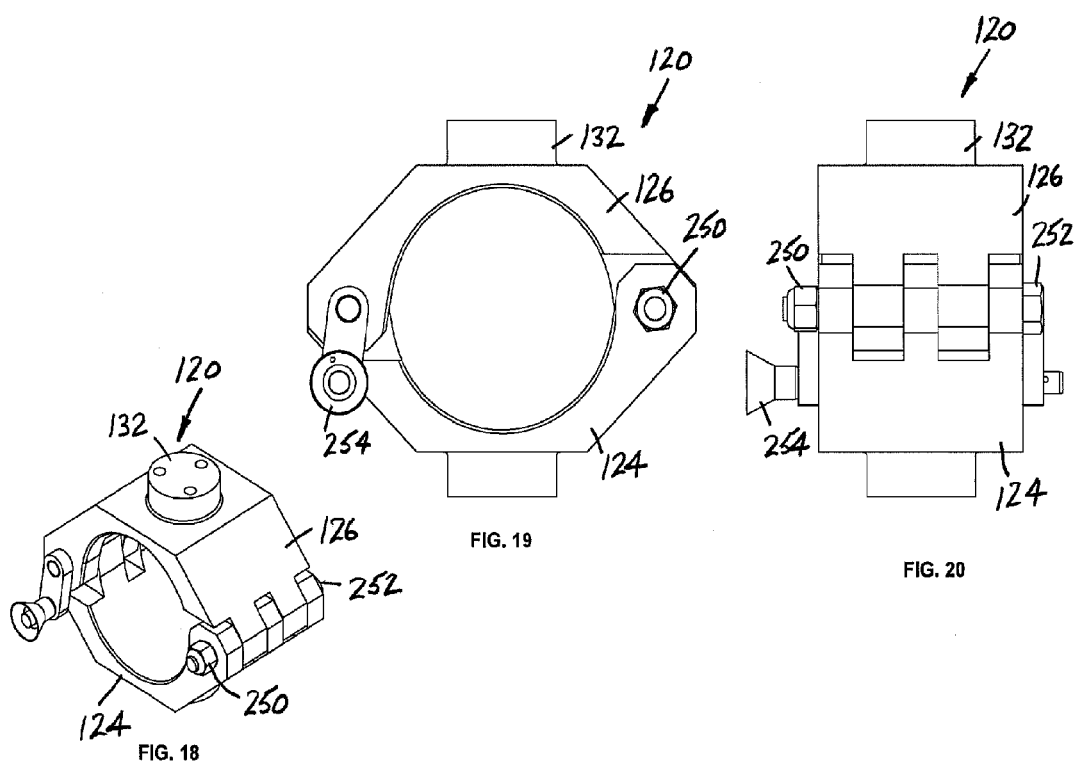

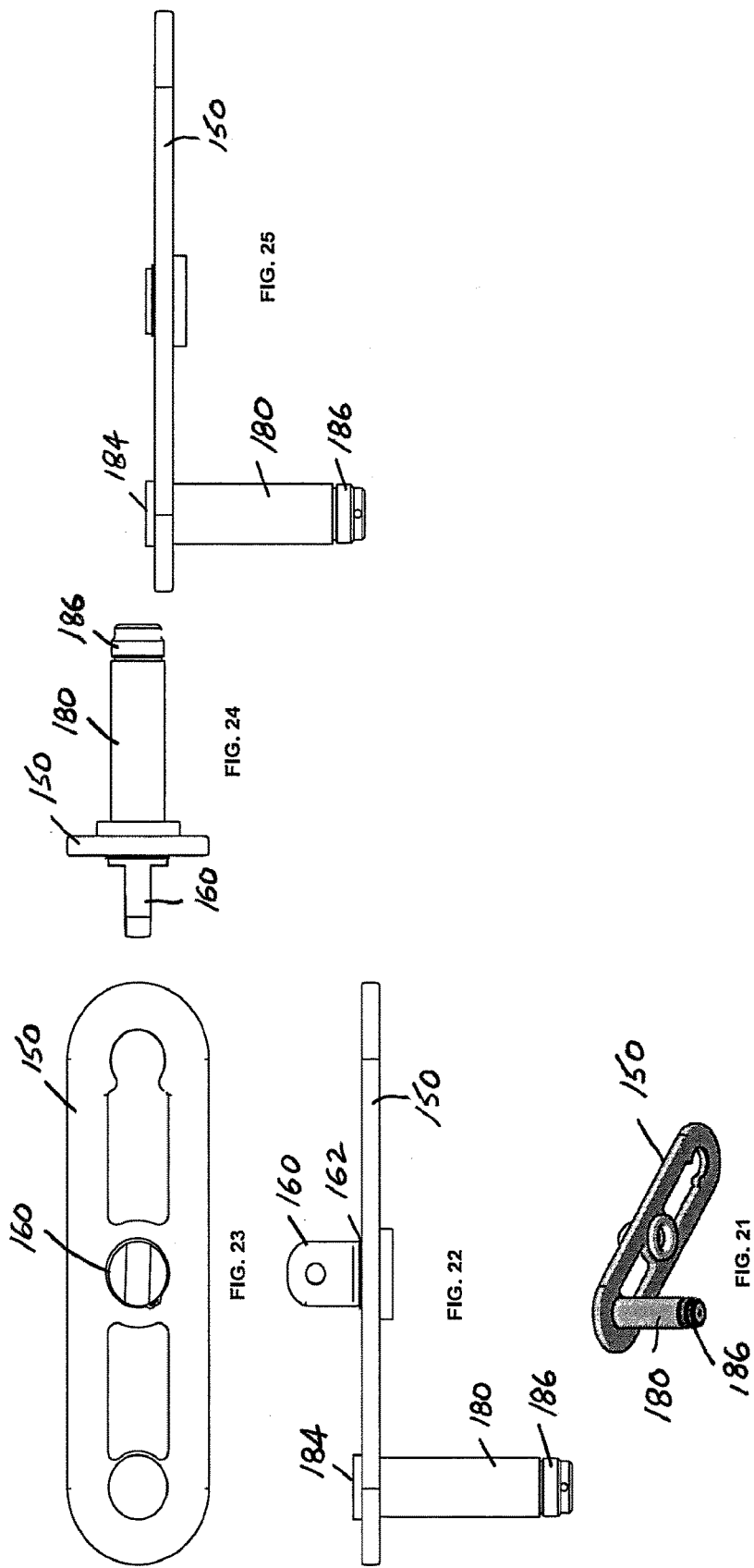

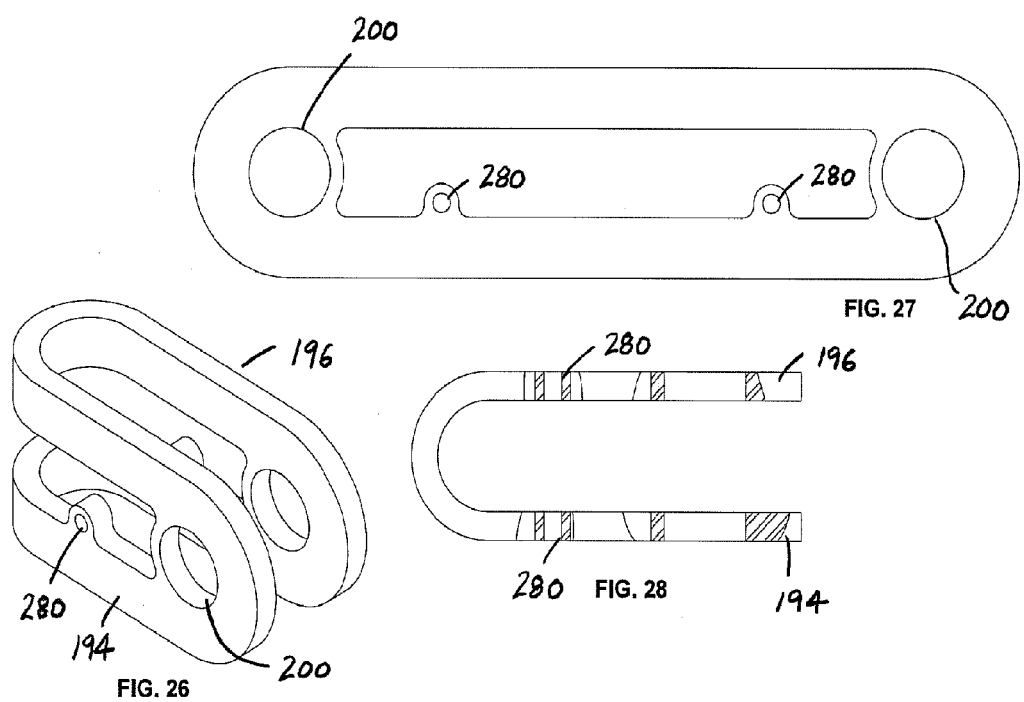

SUSPENSION SYSTEM ESPECIALLY FOR UNDERWATER CABLE

BACKGROUND

This application is a national entry filing of PCT/US2013/075454, filed Dec. 16, 2013, hereby expressly incorporated herein by reference, and also claims the priority benefit of US provisional application Serial No. 61/737,288, filed Dec. 14, 2012, which is also hereby expressly incorporated herein by reference.

The present exemplary embodiment relates to high-strength cable attachments for dynamic applications, and finds particular use in connection with wide-tow and/or high-load seismic surveys. For example, the present disclosure finds particular application in conjunction with mid-span cable attachments and for connecting paravanes, compressors and floats, lines, and light packages to cable spans, and will be described with particular reference thereto. However, it is to be appreciated that the present exemplary embodiments are also amenable to other like applications.

For example, today's three-dimensional (3D) seismic operators tow sixteen (16) or more streamers to provide large amounts of data to meet the demands required in connection with seismic mapping. As a result, a need exists for lead-in line protection for the cable, and a low profile, full strength seismic lead termination design that can effectively grip a towed cable. In particular, the termination must be able to be installed mid-span at any location on the lead-in and be conveniently designed so the termination can be wound on to a cable drum.

The assignee of the present application presently sells a commercial unit known as a Dyna-Hanger Suspension System (DHSS). The DHSS is a reliable cable attachment point for seismic streamers, paravanes, surface and subsurface floats, cable compressors, and other instances requiring mid-span termination. The commercially available DHSS provides for two degrees of freedom with respect to the cable axis. Particularly, a collar assembly can rotate 360° around the cable to provide a first degree of freedom, and a pair of trunnion-mounted arms articulates fore and aft to provide a second degree of freedom. As a result, the lead-in can rotate and the arms of the DHSS can become aligned with the load. When stored on deck, the collar assembly of the DHSS is removed to allow the housing and rods to be reeled directly on to a cable drum.

Although the DHSS has met with commercial success, there are continued needs for improvement. For example, ease of assembly/disassembly, an increased number of degrees of freedom, modularity, subassemblies, reliability, strength, ease of manufacture and efficiency of manufacture, limiting the number of tools required for assembly and disassembly, reduced drag, adaptability to different configurations, reduced cost, etc. are just some of the desired needs, although it will be recognized that this list is not deemed to be limiting or exhaustive.

BRIEF DESCRIPTION

A suspension system includes first and second mount arms disposed in spaced relation and receiving an associated cable. A collar assembly having first and second collar members is dimensioned to circumferentially enclose around the associated cable in a first assembled position, and the first and second collar members do not circumferentially enclose the associated cable in a second open position.

The first and second collar members are pivotally mounted to the first and second mount arms, respectively.

In one embodiment, the first and second collar members are identical.

The first and second collar members include overlapping fingers having openings extending therethrough for receiving pins to circumferentially and axially join the first and second collar members together.

The collar assembly receives a housing having first and second housing members adapted to receive the associated cable therethrough, and dimensioned for relative rotation between the collar assembly and the housing.

The collar assembly and housing are configured to preclude relative axial movement therebetween when assembled on the associated cable.

The suspension system further includes at least one post joining the first and second mount arms together.

The at least one post includes a flange at a first end secured to the first mount arm, and in a preferred arrangement the flange is welded to the first mount arm.

The at least one post has a threaded second end secured to the second mount arm via a threaded nut.

The suspension system further includes a float attachment joined to at least one of the first and second mount arms, where the float attachment is configured and mounted for rotation relative to the at least one mount arm.

The suspension system further includes at least one sheave assembly secured to at least one of the first and second mount arms.

The at least one sheave assembly includes a sheave assembly having a rotatable sheave secured to the first and second mount arms.

The rotatable sheave is received over a post joining the first and second mount arms together.

The rotatable sheave mount of the at least one sheave assembly includes a generally U-shaped flange having first and second portions extending outwardly from a bight region dimensioned for receipt around the post joining the first and second mount arms together.

The flange is configured for rotation relative to the post.

A shaft extends between the first and second portions of the flange for rotatably receiving the sheave thereon.

A threaded nut is received on one end of the shaft and/or post, and a retention pin is received through the shaft and/or post outboard of the threaded nut to retain the nut.

The retention pin includes a flat edge to prevent rotation of the pin.

The retention pin includes a detent to preclude inadvertent removal of the pin.

The threaded nut includes enlarged external lugs to facilitate finger tightening/loosening.

A first sheave assembly includes a rotatable sheave that rotates about a first axis and a second sheave assembly includes a rotatable sheave that rotates about a second axis different from the first axis, e.g., where the first and second axes are spaced apart, and in one embodiment the axes are parallel and in another embodiment the axes are perpendicular.

In still another embodiment, an opening in the flange temporarily receives a pin to hold the flange relative to the post while the flange is mounted to a shaft extending between the first and second portions of the flange for rotatably receiving the sheave thereon.

Primary benefits of the present disclosure include a reduced cost to manufacture.

Another advantage resides in the use of common components to reduce inventory.

Still another advantage resides in the ease of assembly.

Still other benefits and advantages will become apparent upon reading and understanding the following detailed description.

BRIEF DESCRIPTION OF THE DRAWINGS

FIGS. 18-20 are enlarged views of the collar assembly and quick release pin therefor.

FIGS. 21-23 are views of a subassembly of a mounting arm, float or buoy attachment, and post arrangement.

FIGS. 24-25 are views of the subassembly of the mounting arm and post arrangement without a float attachment.

FIGS. 26-28 are views of still another rotating sheave mount flange.

DETAILED DESCRIPTION

Figure 1:
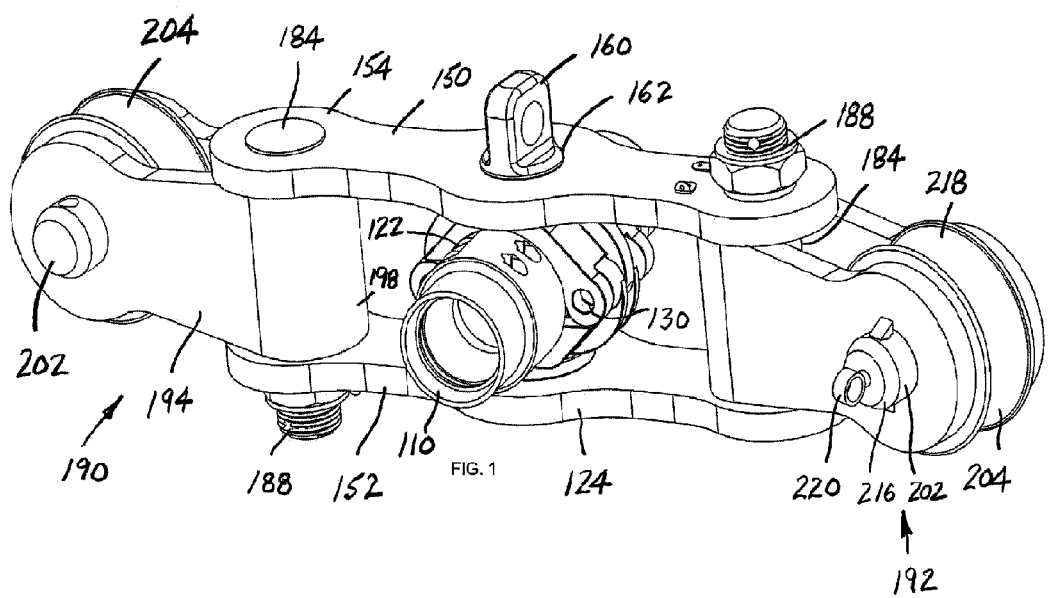
FIG. 1 is a perspective view of one embodiment of the subject suspension system.
Figure 2:
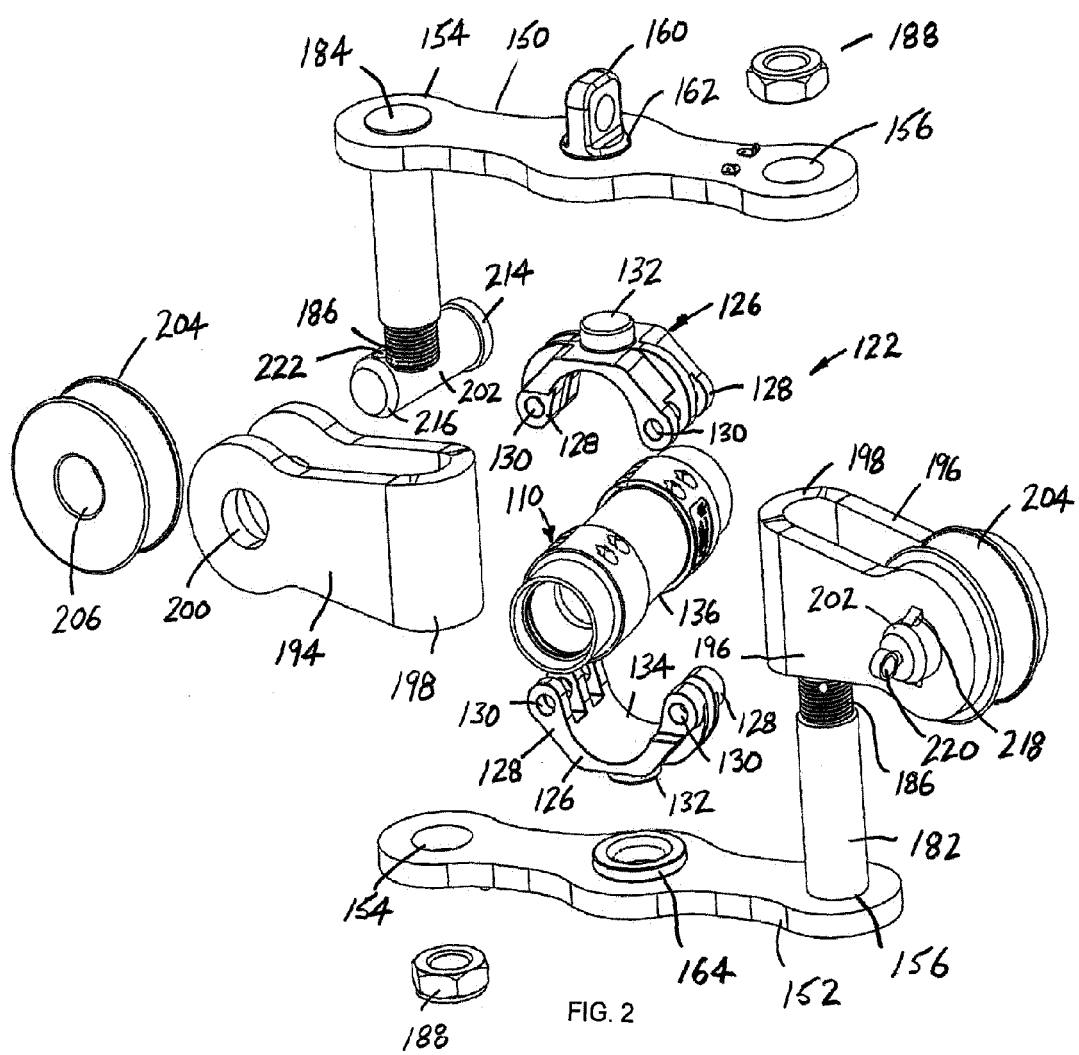
FIG. 2 is an exploded view of the embodiment of FIG. 1.
Figure 3A:
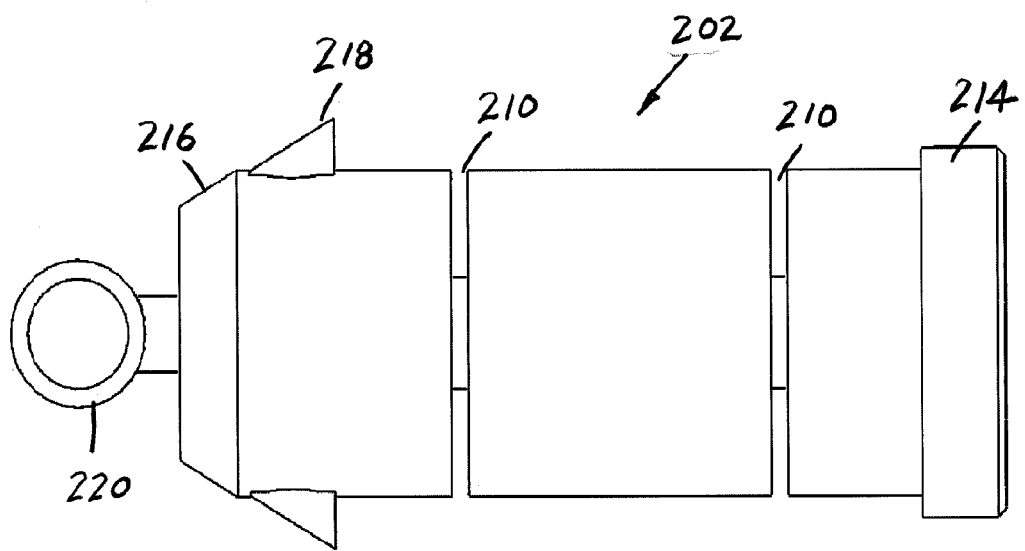
FIGS. 3A-3D are views of different types of rotating sheave mount pins.
Figure 3B:
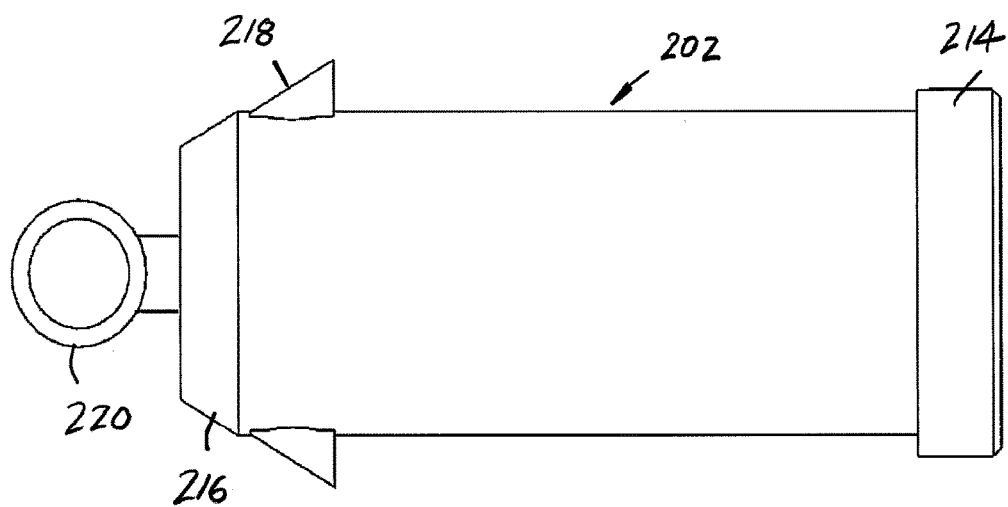
Figure 3C:
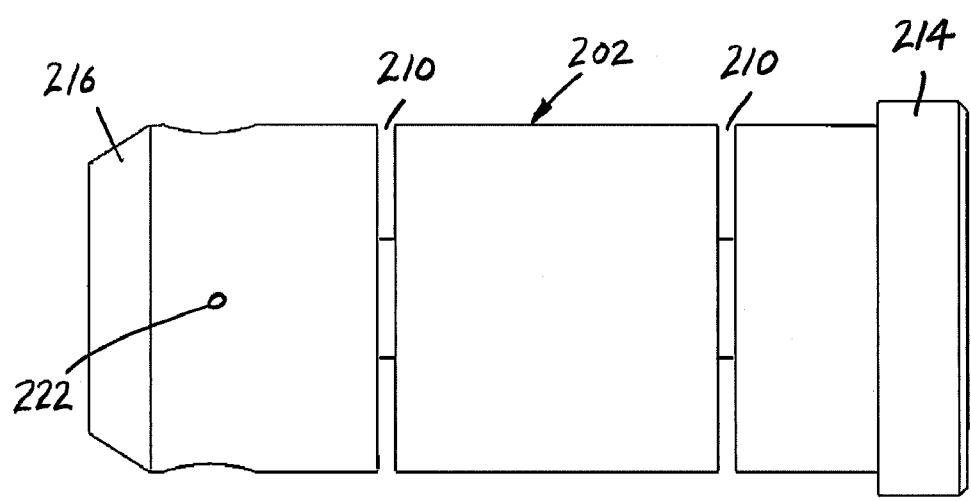
Figure 3D:
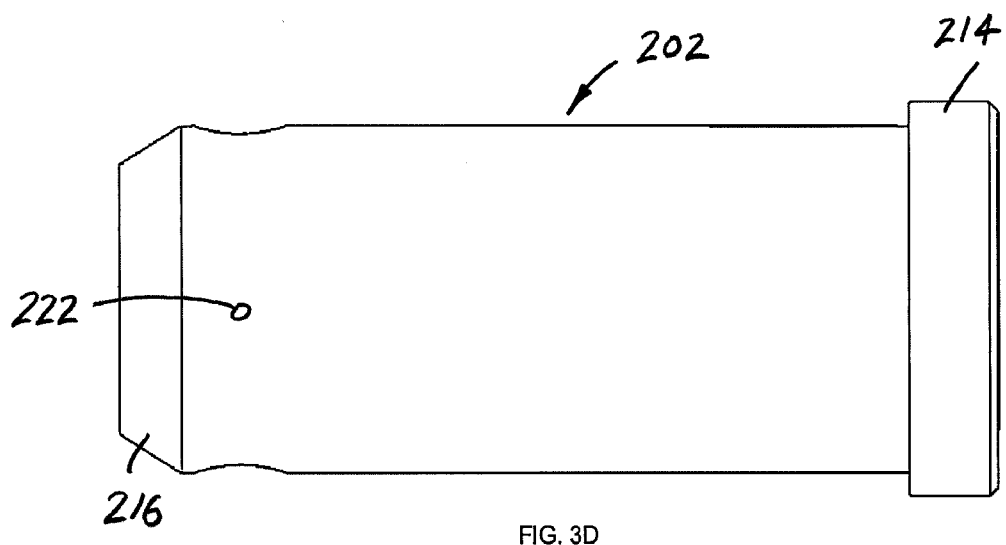
Figure 4:
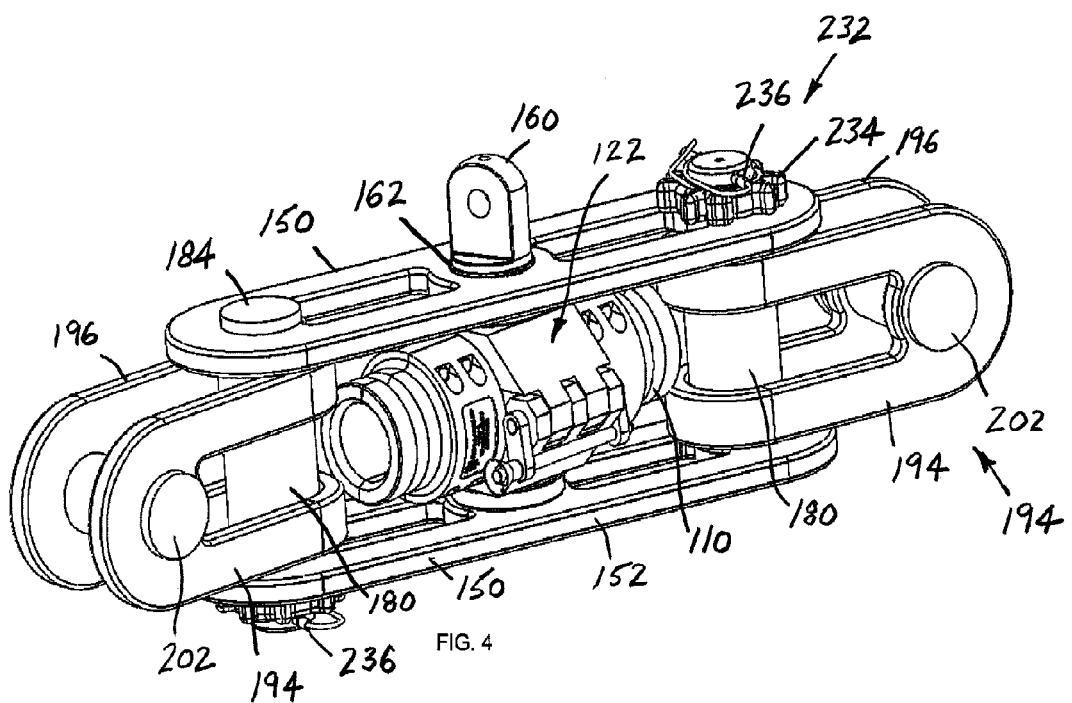
FIG. 4 is a perspective view of another embodiment of a suspension system bearing many similarities to FIG. 1.

With reference to FIGS. 1 and 2, there is shown an exemplary embodiment of a suspension system 100. More particularly, there is an interior housing or sleeve 110 that is received around an associated cable (not shown) and the housing is received over a limited longitudinal extent of the cable, preferably a mid-span location. The structure of the cable and bending strain relief support structure are known to those skilled in the art, and further details of same may be found in commonly owned PCT/2013/068316, filed Nov. 4, 2013, the details of which are incorporated herein by reference.

Figure 5:
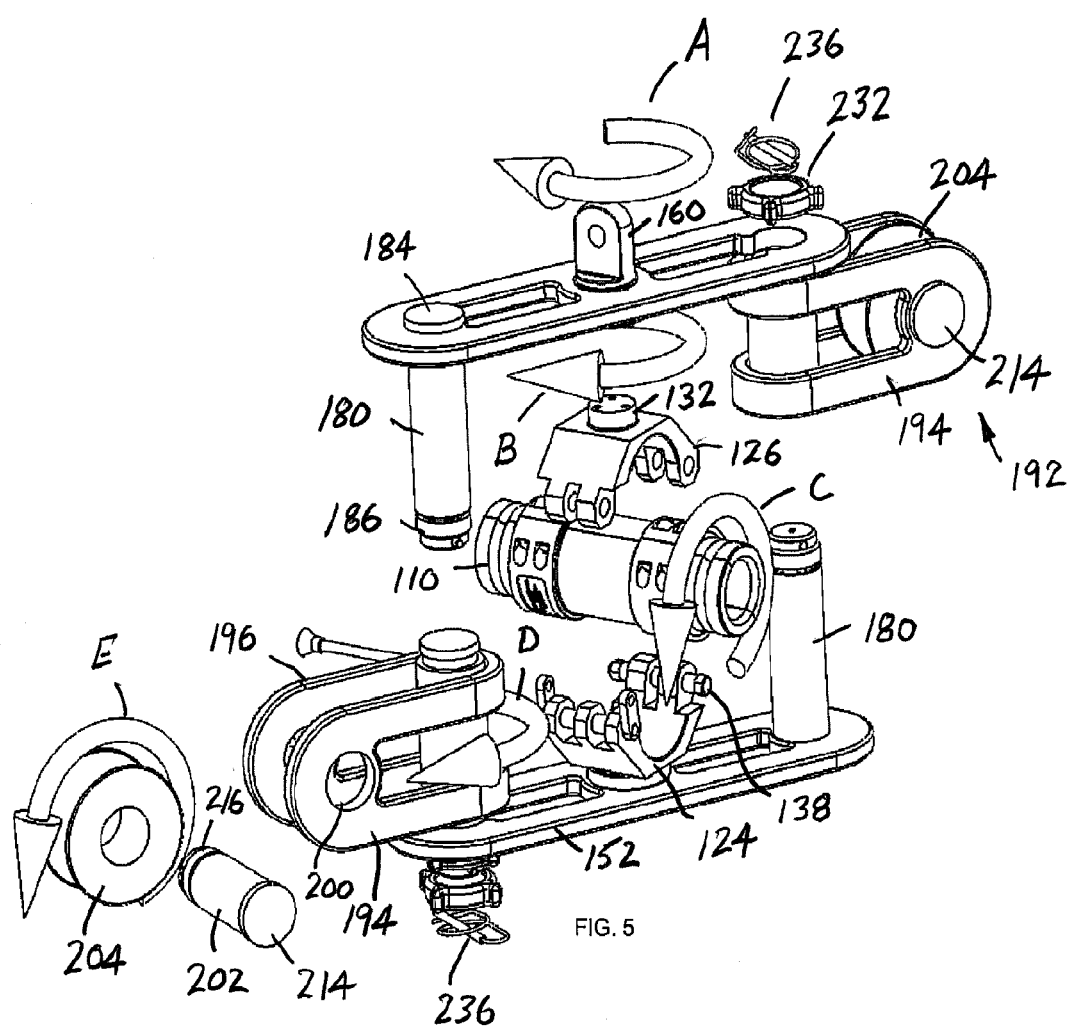
FIG. 5 is an exploded view of the embodiment of FIG. 4.
Figure 7:
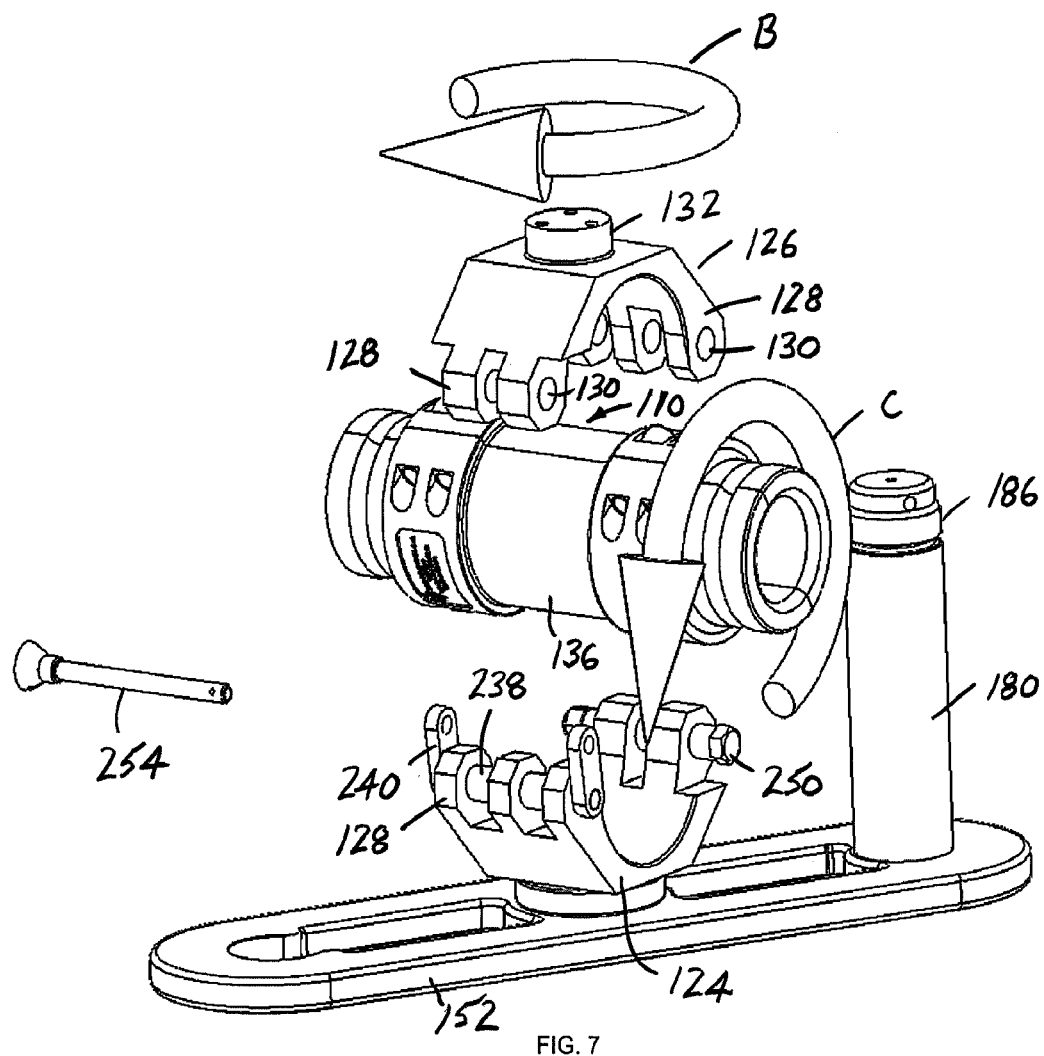
FIG. 7 is a partially assembled view of other portions of the embodiment of FIG. 4.
Figure 8:
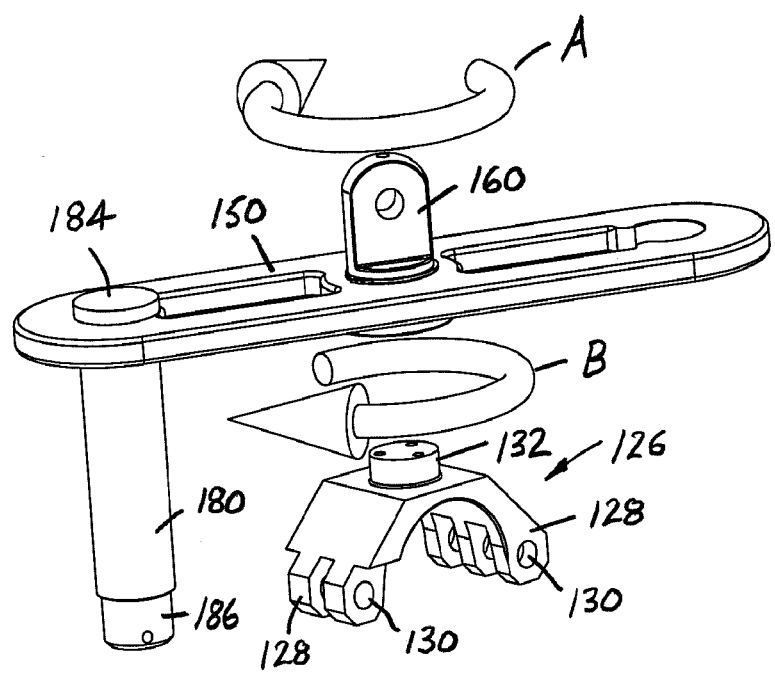
FIG. 8 is a perspective view illustrating other portions of the embodiment of FIG. 4.
Figure 9:
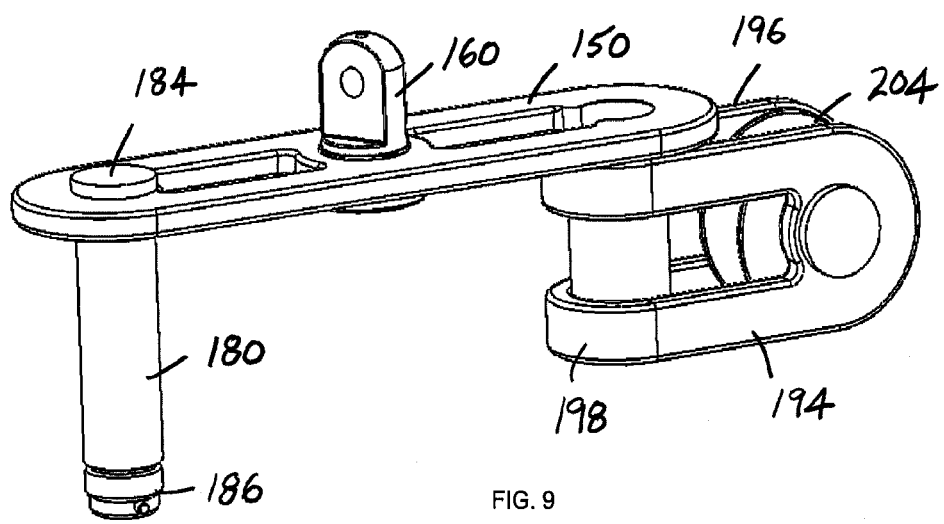
FIG. 9 is a perspective view illustrating still further portions of the embodiment of FIG. 4.
Figure 10:
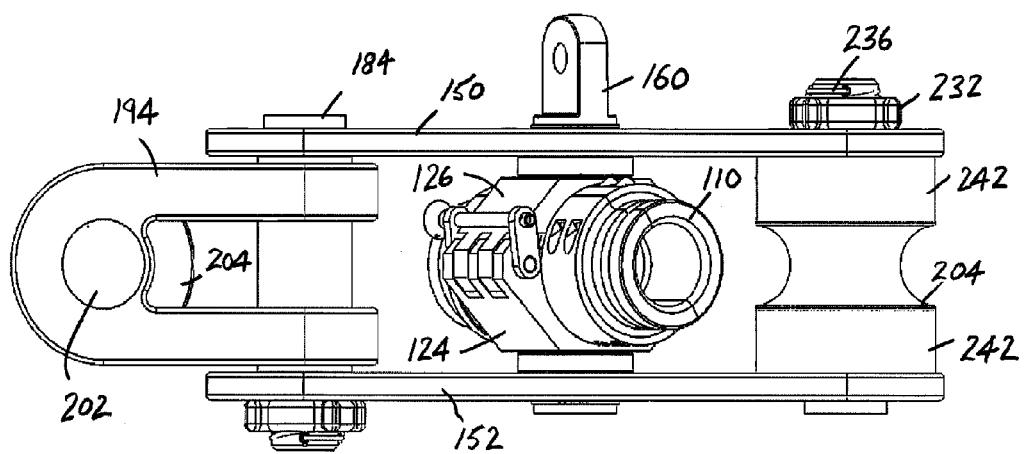
FIG. 10 is an elevational view of yet another embodiment.

A collar assembly 120 includes first and second collar members 122, 124. As illustrated, the collar members 122, 124 are preferably identical to simplify manufacture and interchangeability, particularly during assembly, disassembly, and/or replacement. Each collar member 122, 124 has a central body portion 126 and a series of axially spaced flanges or fingers 128 at opposed edges that include aligned openings 130 extending axially therethrough. In addition, a projection or boss 132 extends outwardly from an external surface of the collar, opposite from the curved inner surface 134. In this manner, the collar members 122, 124 are oriented so that the curved surfaces 134 are received in a recess 136 formed in an external surface of the housing 110. The fingers 128 from the respective collar members 122, 124 are interleaved so that openings 130 are aligned with one another and adapted to receive a fastener connecting pin 138 (FIGS. 5 and 7). For example, a connecting fastener/pin 138 may be received along one edge of the mating collar members in a first position in order to form a hinge that is open and partially circumscribes the outer perimeter of the housing 110. Once the cable and housing are positioned in the collar members 122, 124, the opposite edges of the collar members are then brought into alignment and a connector pin 138 received therein to complete the circumferential capture of the cable and housing within the collar assembly 120. It will be appreciated, however, and as perhaps best illustrated in FIG. 5, that the collar assembly 120 is closed around the cable/housing 110 yet still permits the cable/housing to rotate relative to the collar assembly.

The suspension system 100 further includes first and second mounting arms 150, 152. Again, for ease of manufacture, assembly/disassembly, and/or replacement, the mounting arms 150, 152 are preferably identical structures, although this need not necessarily be the case. Each mounting arm 150, 152 preferably has first and second openings 154, 156 disposed adjacent first and second ends. In addition, and as evident by comparing FIGS. 2 and 5, the remainder of the mounting arms 150, 152 may adopt slightly different configurations such as the solid conformation of FIG. 2 and a slotted arrangement of FIG. 5. Providing the slots in the embodiment of FIG. 5, for example, reduces the overall weight of the system without impacting functionality or strength of the mounting arms.

A free-to-rotate float attachment 160 is preferably secured with a retaining ring 162 provided on the first mounting arm 150. An inner surface (not shown) of the float attachment 160 receives the boss 132 from the first collar member 122, while the other mounting arm 152 includes a plug 164 having a recessed inner surface adapted to receive the boss 132 from the lower collar member 124. When used, the float attachment 160 provides a convenient attachment point along with a desired degree of freedom (i.e., the float attachment 162 rotate relative to the support arm. Likewise, the bosses 132 of the collar members allow the collar assembly 120 and enclosed cable/housing 110 to also pivot or rotate relative to the first and second mounting arms 150, 152.

The mounting arms 150, 152 are maintained in spaced, parallel relation by first and second posts 180, 182. Opposite ends 184, 186 of each post are received in a respective opening 154, 156 in the mounting arms 150, 152. In one preferred arrangement, the first end 184 of each post 180, 182 is secured such as through a welding operation to the mounting arm. The second end 186 is threaded and cooperates with a retaining nut 188 (see FIG. 2). In the embodiment of FIGS. 1 and 2, the external surface of the posts 180, 182 serve as a bearing surface associated with first and second rotating sheave mounts 190, 192. Each sheave mount 190, 192 includes a generally U-shaped flange having first and second arms 194, 196 interconnected along a bight region 198. Outer ends of the arms 194, 196 have aligned openings 200 passing therethrough that receive a pin 202 that serves as a support shaft for the rotating sheave 204. A central opening 206 in the sheave is aligned with the openings 200 in the first and second arms 194, 196 of the U-shaped flange and suitably dimensioned to receive the pin 202 therethrough.

Different embodiments of pins or shafts 202 are shown in FIGS. 3A-3D. Axially spaced grooves 210 provided to segregate the central bearing portion of the shaft from the support ends 212 of the pin 202. In this manner, under a predetermined load, the central bearing portion with separate from the remainder of the pin due to the reduced cross-sectional diameter in the regions of the grooves. A first end of the pin 202 includes an enlarged shoulder 214 that limits axial insertion of the pin through the aligned openings in the flange and the sheave. A second end has a tapered nose 216 that helps to insert the pin through the aligned openings. In addition, triangular-shaped detent 218 deflects inwardly as the pin 202 is passed through the openings, and the detent 218 flexes outwardly into the position shown in FIGS. 3A and 3B once the pin is fully inserted. A finger receiving hole 220 facilitates an outward pull force that retracts the detents 218 when the pins are in the mounted relation and disassembly is desired. Also, this arrangement will not lose strength by having features only on non-load bearing sides of the pin. Alternatively, FIGS. 3C and 3D include an opening 222 that receives a cotter pin or other suitable fastener for preventing inadvertent removal of the pin 202.

FIGS. 4-9 illustrate an embodiment substantially similar to that of FIG. 1. One primary difference is that the support arms 150, 152 include openings to make the structures lightweight and allow for the passage of fluid. In this manner, less drag is exerted by the suspension system. Likewise, the U-shaped flanges of the sheave mounts also include openings 230 that generally serve these same purposes, i.e., make the structures lightweight, allow for the passage of fluid, and exert less drag on the suspension system. The nut 232 at the end of each post is also modified to include enlarged finger-engaging projections 234 that allow the nut to be manually installed and removed on the threaded end of the post 180. Once installed, a cross pin 236 is inserted through a small diameter opening in the post 180 to retain the nut 232 in place.

Figure 6:
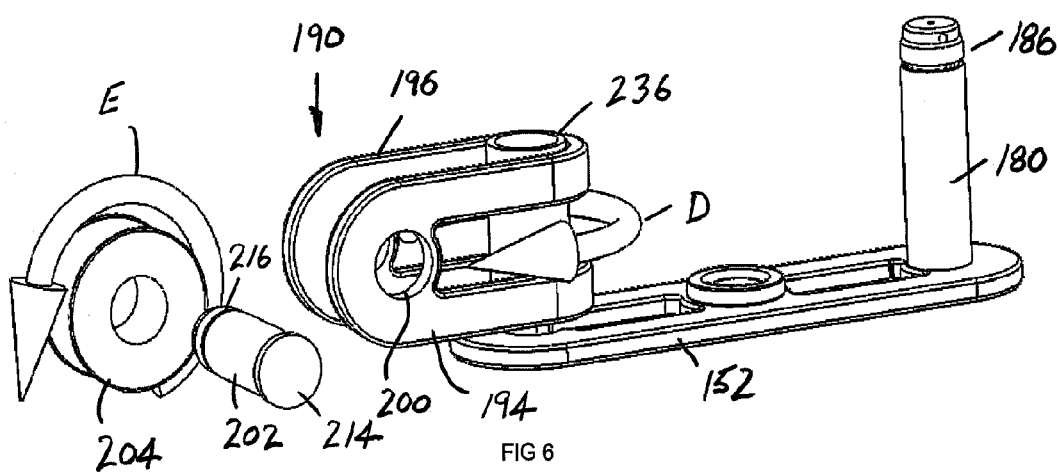
FIG. 6 is a partially assembled view of portions of the embodiment of FIG. 4.

The various degrees of freedom of movement are exemplified in FIGS. 5-7. Particularly, the float attachment 160 can rotate relative to the support arm 150 (or support arm 152 if it is provided with a float attachment) as represented by reference arrow A. Likewise, the collar assembly 120 can rotate about boss 132 as represented by reference arrow B. Further, the housing 110 can rotate relative to the collar assembly 120 as represented by reference arrow C. Still further, reference arrow D represents relative rotation of the U-shape flange of the sheave mount rotating relative to post 180. Moreover, the sheave 204 can rotate around pin 202 as represented by reference arrow E.

FIG. 6 also illustrates a sleeve 236 provided in the bight region of the U-shape flange of the sheave assembly. The sleeve 236 is dimensioned for receipt over the external surface of the post 180 and distributes the bearing forces due to relative rotation over the enlarged surface area of the post.

More particularly illustrated in FIG. 7 is a quick release arrangement of the collar assembly 120. Pin 250 holds one side of the collar members 124, 126 together via the openings 130 in the interleaved fingers 128. Further, one of a pair of pins 238 is shown in FIG. 7 which has a length to pass through 2-½ of the interleaved fingers. An outer end of the pin 238 includes a link 240 that has an opening adapted to receive the elongated stem of the quick release pin 254. Thus, removal of the pin 254 allows the individual pins 238 to be subsequently accessed whereby removal allows rotation about pin 250 of one collar member relative to the other collar member.

Figure 11:
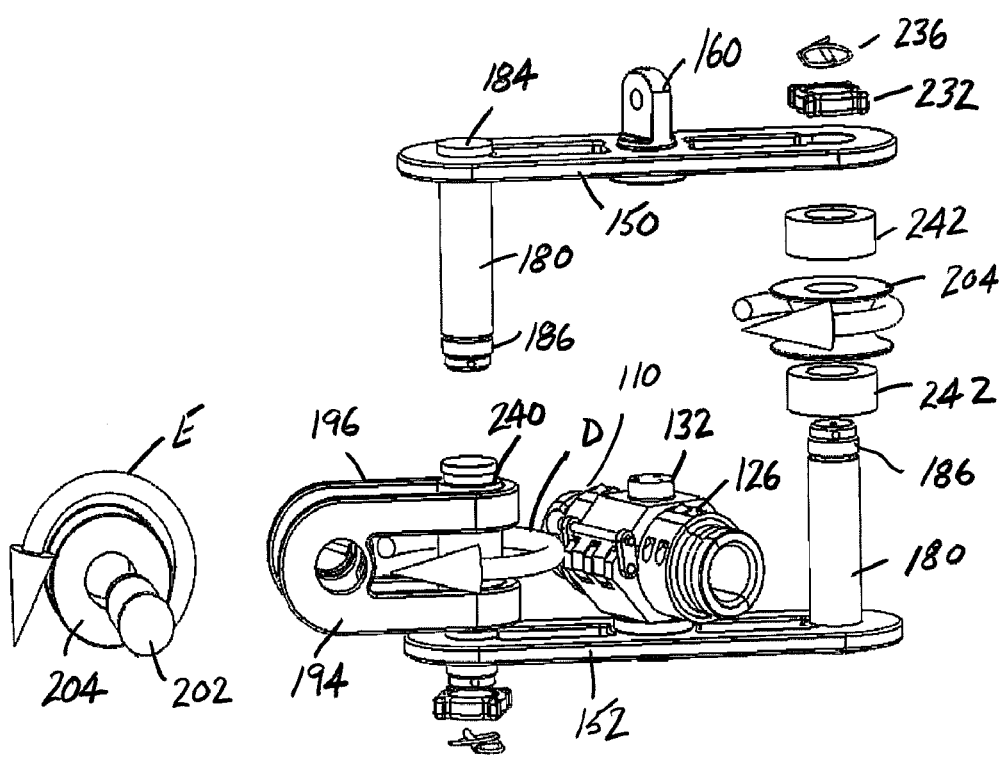
FIG. 11 is a partially assembled and partially exploded view of the embodiment of FIG. 10.

FIG. 11 illustrates an alternative mounting of the right-hand sheave 204. Particularly, the upper and lower spacer blocks 242 position the sheave 204 approximately mid-height along the post 180. In this manner, the right-hand sheave rotates about an axis defined by the post 180 while the left-hand sheave rotates about pin 202, in which sheave mount also rotates relative to post 180 as described above.

Figure 14:
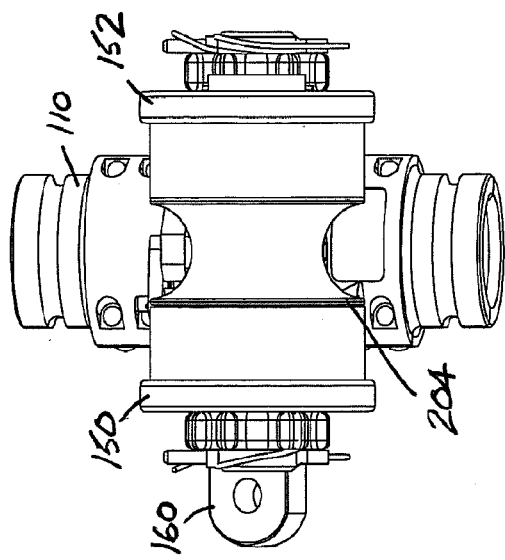
FIGS. 12-14 are views of still another modified embodiment.
Figure 13:
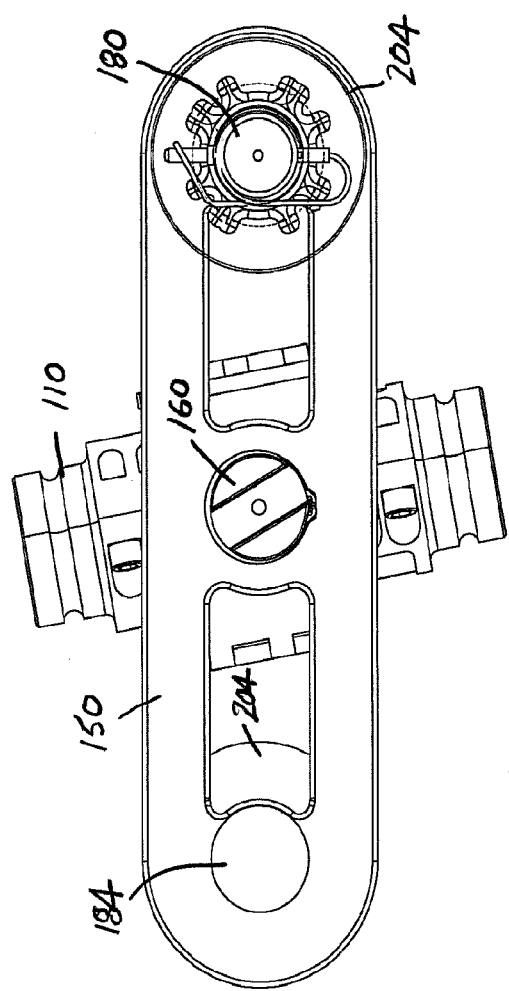
Figure 12:
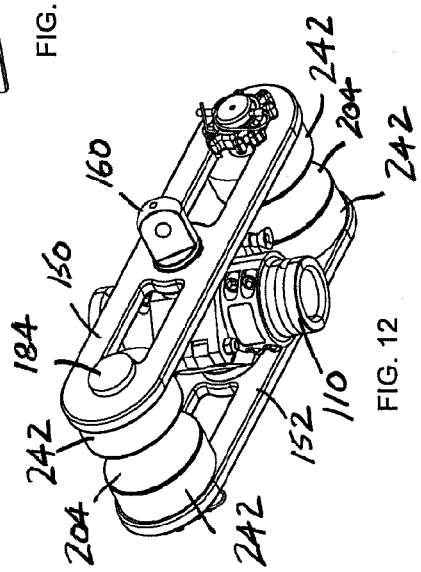

In the arrangement of FIG. 12, both the right-hand and left-hand sheaf mounts are similar to the right-hand sheave mount of FIG. 11, i.e., the sheave 204 disposed between spacer blocks 242 rotate about the post 180. Additional details are also illustrated in FIGS. 13-14.

Figure 15:
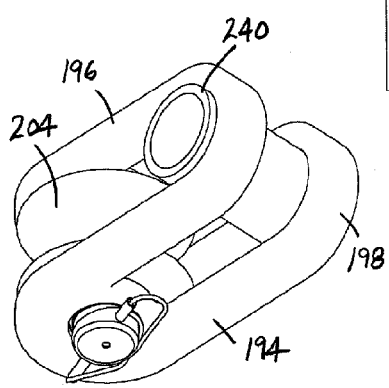
FIGS. 15-17 illustrate details of a sheave mounting assembly.
Figure 16:
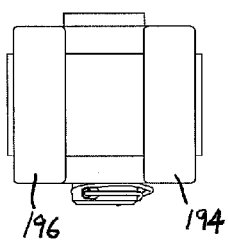
Figure 17:
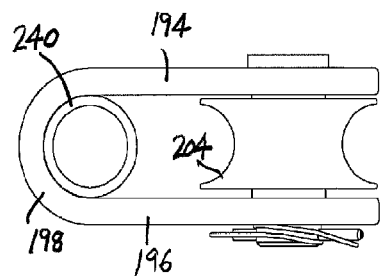

FIGS. 15-17 illustrate the inclusion of sleeve 240 in the bight portion of the U-shaped sheave flange. This arrangement still provides for easy assembly and disassembly of the individual components of the suspension system.

FIGS. 18-20 are provided to show additional clarifying details of the collar assembly 120. Similarly, FIGS. 21-25 show enlarged details of the support arm 150 with a rotatable float mount 160 (FIGS. 21-23) or without the float mount (FIGS. 24-25).

FIGS. 26-28 illustrate a modified U-shaped flange associated with a rotating sheave mount. This arrangement allows for installation of the sheave mount assembly after the mount arms have been secured together. Particularly, small openings 280 receive a pin (not shown) that temporarily holds the U-shape flange around the post during assembly. In this manner, the support arms 150, 152 can be secured together via the posts 180. Subsequently, the U-shaped flange is received around the post 180, and a temporary pin inserted through the aligned openings 280. This holds the flange in place while assembly of the rotating sheave 204 and its support pin 202 is completed.

Figure 29:
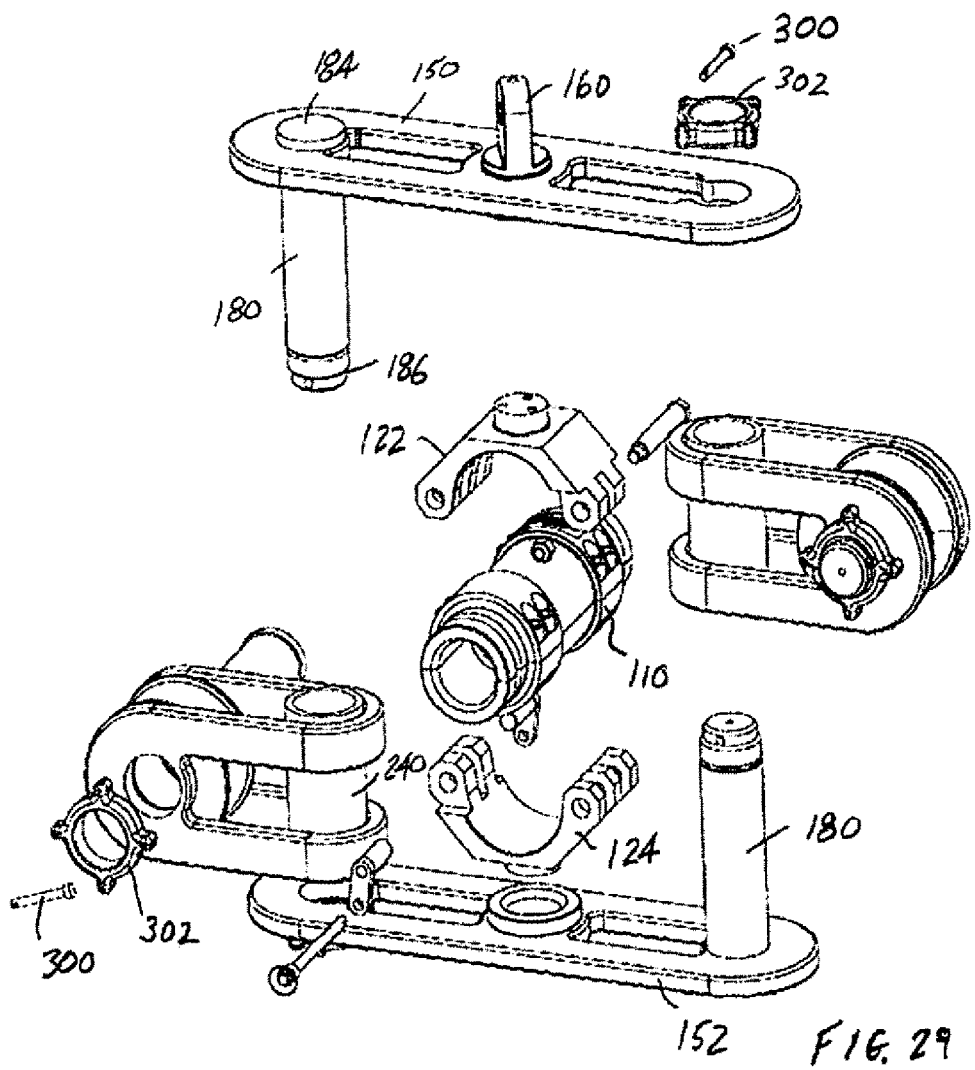
FIGS. 29 and 30 are exploded and assembled views of another embodiment of the present disclosure.
Figure 30:
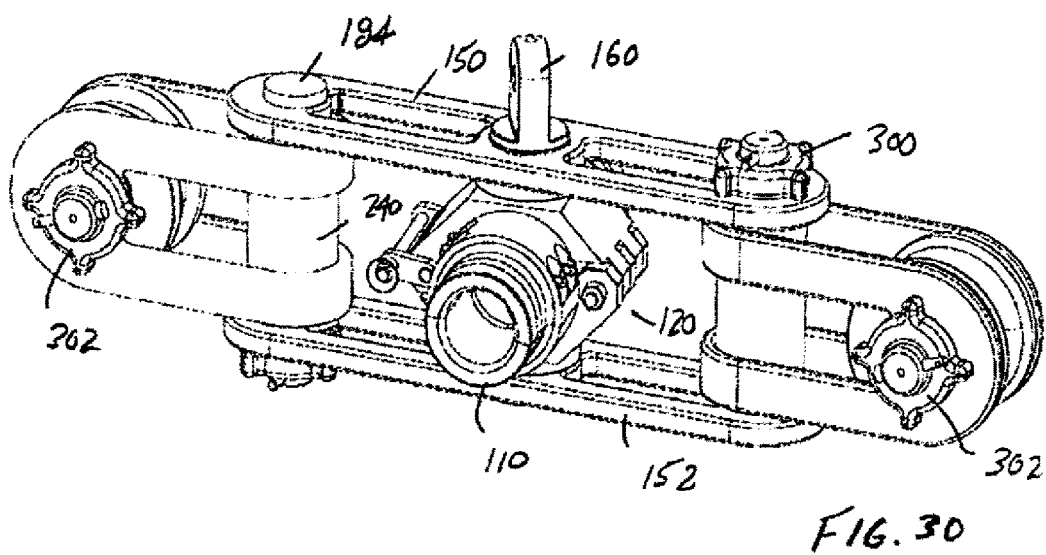
Figure 31:
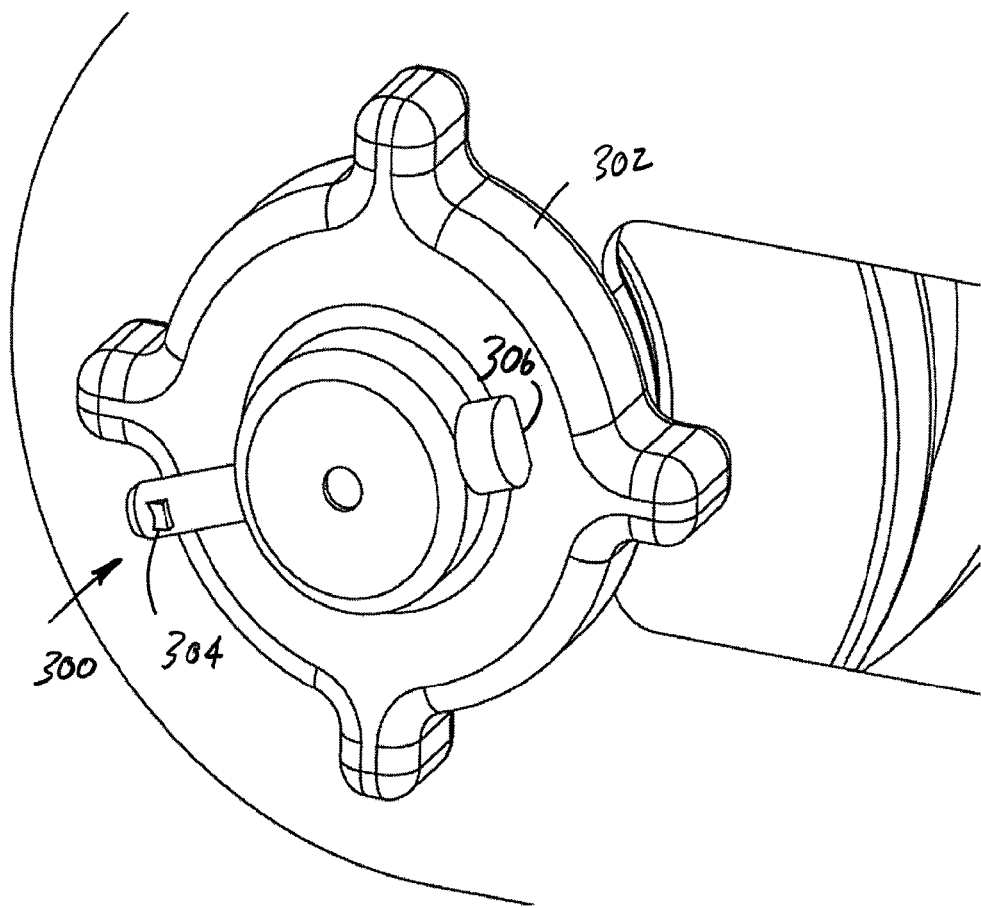
FIG. 31 is an enlarged view of a fastening nut and pin arrangement used to assemble components.

FIGS. 29 and 30 illustrate exploded and assembled views of a slightly modified embodiment, particular details of which are illustrated in FIG. 31. Specifically, the retention pins 300 associated with each of nuts 302 are modified to include a detent 304 at one end which prevents inadvertent removal of the pin and retains the nut in place. Also, the opposite end of the pin 300 preferably has a D-shape which allows the pin to lay flat against the nut along the flat surface 306.

Most components are made of high-grade stainless steel and intended to be reused for many deployments and retrievals. It will be appreciated, however, that other materials may be used if deemed acceptable for use in the harsh marine environment. The various embodiments are lightweight, and provide openings for the passage of fluid therethrough, which improves drag characteristics of the suspension system. Many of the components are interchangeable so that the same nuts and retaining pins can be used for securing different components together.

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

We claim:

1. A suspension system receiving an associated cable, the suspension system comprising:
    first and second mount arms disposed in spaced relation;
    a collar assembly having first and second collar members dimensioned to circumferentially enclose around the associated cable in a first assembled position, and a second open position, where the first and second collar members do not circumferentially enclose the associated cable, wherein the collar assembly receives a housing having first and second housing members adapted to receive the associated cable therethrough, and dimensioned for relative rotation between the collar assembly and the housing; and
    at least one post joining the first and second mount arms together.

2. The suspension system of claim 1 wherein the first and second collar members are pivotally mounted to the first and second mount arms, respectively.

3. The suspension system of claim 1 wherein the first and second collar members are identical.

4. The suspension system of claim 1 wherein the first and second collar members include overlapping fingers having openings extending therethrough for receiving pins to circumferentially and axially join the first and second collar members together.

5. The suspension system of claim 1 wherein the collar assembly and the housing are configured to preclude relative axial movement therebetween when assembled on the associated cable.

6. The suspension system of claim 1 wherein the at least one post includes a flange at a first end welded to the first mount arm.

7. The suspension system of claim 1 wherein the at least one post has a threaded second end secured to the second mount arm via a threaded nut.

8. The suspension system of claim 1 further comprising at least one sheave assembly secured to at least one of the first and second mount arms wherein the at least one sheave assembly includes a rotatable sheave mount secured to the first and second mount arms, and configured for movement relative thereto.

9. The suspension system of claim 8 wherein the rotatable sheave mount of the at least one sheave assembly includes a generally U-shaped flange having first and second portions extending outwardly from a bight region dimensioned for receipt around a post joining the first and second mount arms together.

10. The suspension system of claim 9 further comprising a shaft extending between the first and second portions of the flange for rotatably receiving the sheave assembly thereon.

11. The suspension system of claim 10 further comprising a threaded nut received on one end of the shaft, and a retention pin received through the shaft outboard of the threaded nut to retain the nut.

12. The suspension system of claim 11 wherein the retention pin includes at least one of a flat edge to prevent rotation of the pin and a detent to limit inadvertent removal of the pin.

13. The suspension system of claim 11 wherein the at least one sheave assembly includes a first sheave assembly includes a rotatable sheave that rotates about a first axis and a second sheave assembly includes a rotatable sheave that rotates about a second axis different from the first axis.

14. A suspension system receiving an associated cable, the suspension system comprising:
    first and second mount arms disposed in spaced relation:
    a collar assembly having first and second collar members dimensioned to circumferentially enclose around the associated cable in a first assembled position, and a second open position, where the first and second collar members do not circumferentially enclose the associated cable;
    a float attachment joined to at least one of the first and second mount arms, the float attachment configured and mounted for rotation relative to the at least one mount arm; and
    at least one post joining the first and second mount arms together.

15. A suspension system receiving an associated cable, the suspension system comprising:
    first and second mount arms disposed in spaced relation;
    a collar assembly having first and second collar members dimensioned to circumferentially enclose around the associated cable in a first assembled position, and a second open position, where the first and second collar members do not circumferentially enclose the associated cable; and
    at least one sheave assembly secured to at least one of the first and second mount arms, wherein the at least one sheave assembly includes a rotatable sheave mount secured to the first and second mount arms, and configured for movement relative thereto, and wherein the rotatable sheave mount of the at least one sheave assembly includes a generally U-shaped flange having first and second portions extending outwardly from a bight region dimensioned for receipt around a post joining the first and second mount arms together.

16. The suspension system of claim 15 wherein the at least one sheave assembly includes a sheave assembly having a rotatable sheave secured to the first and second mount arms.

17. The suspension system of claim 16 wherein the rotatable sheave is received over a post joining the first and second mount arms together.

* * * * *